US009003313B1

(12) United States Patent
Cierniak

(10) Patent No.: US 9,003,313 B1
(45) Date of Patent: Apr. 7, 2015

(54) SYSTEM AND METHOD FOR MODIFYING A USER INTERFACE

(75) Inventor: Michal Cierniak, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 418 days.

(21) Appl. No.: 13/460,750

(22) Filed: Apr. 30, 2012

(51) Int. Cl.
G06F 3/048 (2013.01)
G06F 9/455 (2006.01)

(52) U.S. Cl.
CPC .................................... *G06F 9/455* (2013.01)

(58) Field of Classification Search
CPC .................................. G06F 3/048; G06F 9/44
USPC .......................................... 715/762; 717/139
See application file for complete search history.

(56) References Cited

U.S. PATENT DOCUMENTS

| | | | | |
|---|---|---|---|---|
| 6,266,681 B1 * | 7/2001 | Guthrie | ......................... | 715/234 |
| 2002/0078076 A1 * | 6/2002 | Evans | ........................... | 707/204 |
| 2003/0014478 A1 * | 1/2003 | Noble | ........................... | 709/203 |
| 2005/0091364 A1 * | 4/2005 | Bantz et al. | .................... | 709/224 |
| 2008/0235671 A1 * | 9/2008 | Kellogg et al. | ................ | 717/139 |
| 2008/0244509 A1 * | 10/2008 | Buchs et al. | ................... | 717/106 |
| 2008/0250385 A1 * | 10/2008 | Sanchez | ......................... | 717/100 |
| 2009/0083726 A1 * | 3/2009 | Amend et al. | ................. | 717/171 |
| 2009/0282343 A1 * | 11/2009 | Catlin et al. | .................... | 715/738 |
| 2011/0093535 A1 * | 4/2011 | Takakura et al. | .............. | 709/203 |
| 2011/0126158 A1 * | 5/2011 | Fogarty et al. | ................. | 715/835 |
| 2011/0276946 A1 * | 11/2011 | Pletter | ............................ | 717/124 |

\* cited by examiner

*Primary Examiner* — William Bashore
*Assistant Examiner* — Jeanette J Parker
(74) *Attorney, Agent, or Firm* — McDermott Will & Emery LLP

(57) ABSTRACT

A system and method for determining whether a user interface is properly injected on an electronic device are provided. Web site data for a web site is accessed, additional code are injected into the accessed web site data and the web site based on the injected additional code is provided for display. An actual image of a user interface corresponding to the displayed web site is obtained. An expected image of the user interface in which the additional code is properly injected into the web site is received. The expected image of the user interface with the actual image of the user interface are compared. In a case where the expected image of the user interface and the actual image of the user interface do not match, an error message is generated and notification of the error message is provided to the electronic device.

28 Claims, 5 Drawing Sheets

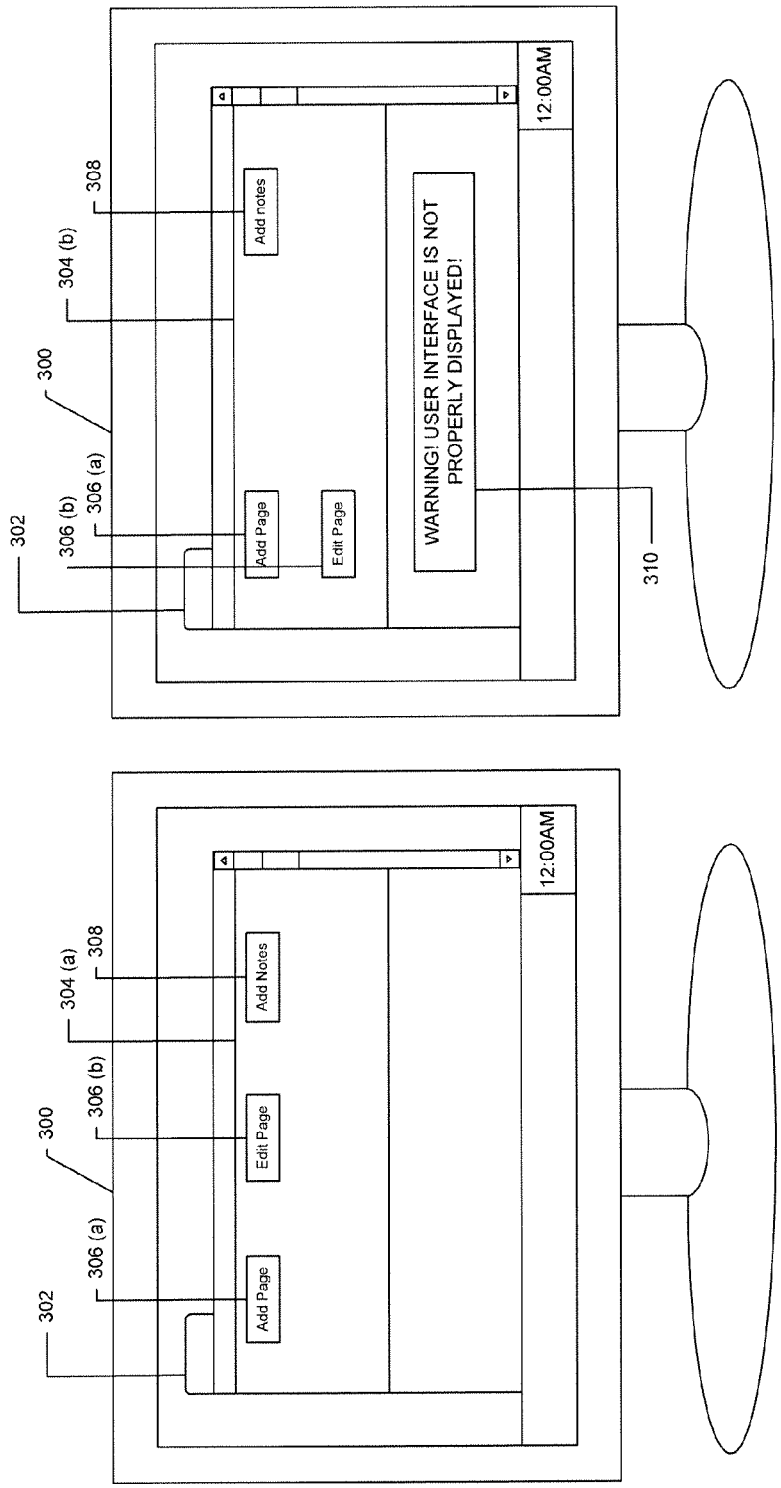

SYSTEM AND METHOD FOR MODIFYING A USER INTERFACE

FIELD

The subject technology generally relates modifying a user interface, and in particular, relates to modifying a user interface on an electronic device.

BACKGROUND

One or more user interfaces for a web site may be added or modified with code defining the one or more user interfaces. However, the defining code may not always provide for display of the user interface as intended.

SUMMARY

The disclosed subject technology relates to a computer-implemented method for determining whether a user interface is properly injected on an electronic device. The method comprises accessing, on an electronic device, web site data for a web site. The method further comprises providing for injection of additional code into the accessed web site data. The method further comprises providing for display of the web site based on the injected additional code. The method further comprises obtaining an actual image of a user interface corresponding to the displayed web site. The method further comprises receiving an expected image of a user interface in which the additional code is properly injected into the web site. The method further comprises comparing the expected image of the user interface with the actual image of the user interface. In a case where the expected image of the user interface and the actual image of the user interface do not match, the method further comprises generating an error message and providing for notification of the error message on the electronic device.

The disclosed subject matter further relates to a system for determining whether a user interface is properly injected on an electronic device. The system comprises one or more processors, and a machine-readable medium comprising instructions stored therein, which when executed by the processors, cause the processors to perform operations comprising accessing, on an electronic device, web site data for a web site. The operations further comprise providing for injection of additional code into the accessed web site data. The operations further comprise providing for display of the web site based on the injected additional code. The operations further comprise obtaining an actual image of a user interface corresponding to the displayed web site. The operations further comprise receiving an expected image of a user interface in which the additional code is properly injected into the web site. The operations further comprise comparing the expected image of the user interface with the actual image of the user interface. In a case where the expected image of the user interface and the actual image of the user interface do not match, the operations further comprise generating an error message, providing for a notification of the error message on the electronic device, providing a server with the actual image of the user interface, and providing the server with a url of the web site.

The disclosed subject matter further relates to a machine readable medium comprising instructions stored therein, which when executed by a system, cause the system to perform operations comprising accessing, on an electronic device, web site data for a web site. The operations further comprise providing for injection of additional code into the accessed web site data, wherein the additional code comprises HTML, JavaScript or Cascading Style Sheet. The operations further comprise providing for display of the web site based on the injected additional code. The operations further comprise obtaining an actual image of a user interface corresponding to the displayed web site. The operations further comprise receiving an expected image of a user interface in which the additional code is properly injected into the web site. The operations further comprise comparing the expected image of the user interface with the actual image of the user interface. In a case where the expected image of the user interface and the actual image of the user interface do not match, the operations further comprise generating an error message, providing for a notification of the error message on the electronic device, providing a server with the actual image of the user interface, providing the server with a url of the web site and modifying the additional code so that the actual image of the user interface matches the expected image of the user interface when injected into the accessed web site data.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

FIG. 3A illustrates an example of an expected image of the user interface.

FIG. 3B illustrates an example of an actual image of the user interface of FIG. 3A.

DETAILED DESCRIPTION

Figure 1:
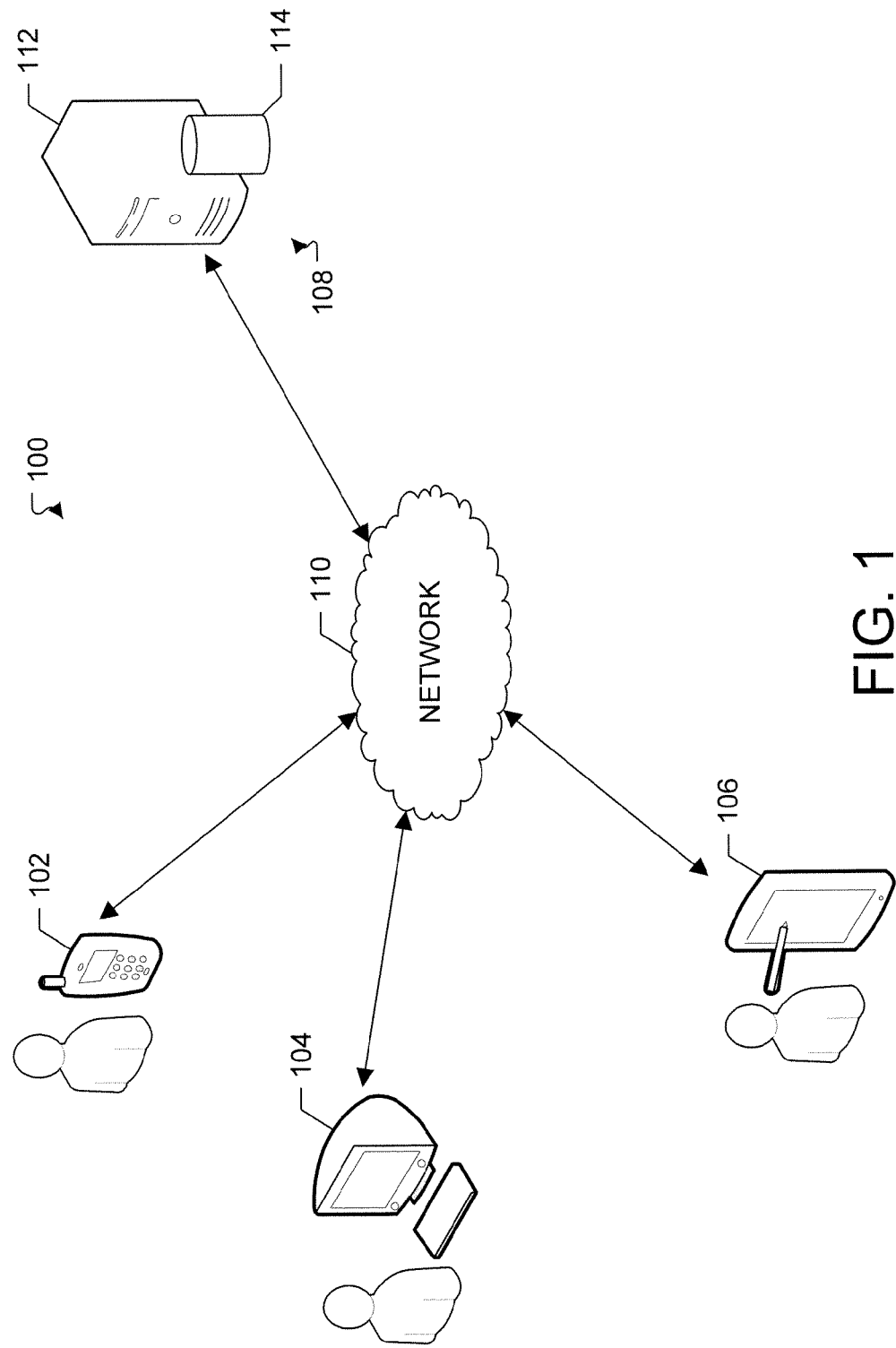
FIG. 1 illustrates an example distributed network environment which can determine whether a user interface is properly injected.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology may run on an application (e.g., a web browser application, an client messaging application, etc.) that is configured to access a web site and provide an interface to display web site data for the web site on an electronic device. Web site data may include content and formatting instructions associated with the web site. The subject technology may receive one or more modifications to one or more web sites. The one or more modifications may include a cascading style sheet (CSS) or other code that provides a user interface. The application may inject the user interface into a web site's layout and provide for display of the layout with the injected user interface without requiring a server hosting the web site to modify the server copy of the web site's layout to include the user interface.

The subject technology may receive an expected image of the user interface. The expected image of the user interface is an image of the user interface as it is properly displayed. The expected image may be generated by a user (e.g., a developer of the user interface). For example, the user may generate an image of what the user expects to see after the user interface is properly injected onto a layout of a web site. The expected image may include the user interface as it is properly displayed. The expected image may also include a portion of, or all of the web site's layout including the properly displayed user interface. The expected image may be generated using one or more applications (e.g., an image rendering application, a web browsing application, etc.). The expected image may be stored on a server and may be accessed via a network. The expected image may also be stored locally (e.g., on a harddisk ROM, RAM, etc.).

The subject technology may also obtain a snapshot of an image of the user interface as it is actually injected. For example, where the user interface includes a user control and one or more buttons associated with the user control, and the user interface is injected into a web site, an expected image of the user interface and an image of the user interface as it is actually injected into the web site are obtained. In addition, an image of an entire layout of a web site including a properly injected user interface and a snapshot of an image of the entire layout of the web site including the user interface as it is actually injected may be obtained.

The subject technology may obtain a snapshot of an image of the user interface as it is actually injected each time the user interface is injected into a web site. Alternatively, snapshots of the user interface as it is actually injected may be taken selectively. Selected web sites may include web sites that have a history of breaking down. The selected web sites may also include web sites that do not receive a significant volume of user access.

A comparison of the expected image of the user interface and the snapshot of the user interface as it is actually injected may be made. For example, a pixel by pixel comparison of the respective images may be made. Additionally, a comparison of an image of an entire layout of a web site including a properly injected user interface and a snapshot of an image of the entire layout of the web site including the user interface as it is actually injected may be made.

The comparison may be done on the user's electronic device. Alternatively, the snapshot of the image of the user interface as it is actually injected and the expected image of the user interface may be sent to a server to compare the two images. User consent may be required to send any data to the server. Additional factors in determining whether the comparison is done on the user's electronic device or on the server may include amount of time the comparison may be made either on the electronic device vs. the server.

In a case where the image of the user interface as it is actually injected and the image of the expected user interface, a message may be provided to the user via the application to notify the user that the user interface was not properly injected. The user may be provided with an option to notify the server that the user interface was not properly injected. The user may be required to consent to sending the snapshot of the user interface as it is actually injected to the server.

Furthermore, the web site's url may be recorded and sent to the server. User consent may be required before the url of the web site can be sent to the server. Additionally, only a section of the web site's url may be sent to the server. For example, where a user interface was not properly injected into www.johndoe.com/johndoe, only www.johndoe.com may be recorded and sent to the server.

Furthermore, the subject technology may modify the modification (e.g., a CSS file that provides a user interface) so the user interface as it is actually displayed matches with the expected user interface. For example, where a user interface as it is actually displayed is injected at a location that is 10 pixels above the desired location of the user interface, the modification providing the user interface may be modified to re-shift the user interface downwards by 10 pixels so the user interface as it is actually injected matches the expected user interface. Additionally, modifications may be made to change colors included in the user interface and/or font size and style of textual elements included in the user interface.

FIG. 1 illustrates an example distributed network environment which can determine whether a user interface is properly injected. A network environment 100 includes a number of electronic devices 102-106 communicably connected to a server 108 by a network 110. Server 108 includes a processing device 112 and a data store 114. Processing device 112 executes computer instructions stored in data store 114, for example, to provide web data for a web site to electronic devices 102-106.

In some example aspects, each of the electronic devices 102-106 may include any machine with appropriate hardware and software to access a web site and provide an interface to display the web site on an electronic device. Electronic devices 102-106 can be mobile devices (e.g., smartphones, tablet computers, PDAs, and laptop computers), portable media players, desktop computers or other appropriate computing devices. In the example of FIG. 1, electronic device 102 is depicted as a smartphone, client electronic device 104 is depicted as a desktop computer, and electronic device 106 is depicted as a tablet computer.

In some example aspects, each of the electronic devices 102-106 may access web site data for a web site. Web site data for a web site may include content and formatting instructions associated with the web site. Furthermore, each of the electronic devices 102-106 may provide for injection of additional code into the accessed web site data on an electronic device. The additional code may include Cascading Style Sheet, HTML, JavaScript, etc. Furthermore, each of the electronic devices 102-106 may provide for display of the web site based on the injected additional code. Furthermore, each of the electronic devices 102-106 may obtain an actual image of a user interface corresponding to the displayed web site. Furthermore, each of the electronic devices 102-106 may receive an expected image of a user interface in which the additional code in properly injected into the web site. Furthermore, each of the electronic devices 102-106 may compare the expected image of the user interface with the actual image of the user interface. The comparing the expected image of the user interface with the actual image of the user interface may include comparing each pixel of the expected image with a corresponding pixel of the actual image. Each of the electronic devices 102-106 may also transmit the expected image of the user interface and the actual image of the user interface to server 108, for comparison of the expected image of the user interface with the actual image of the user interface.

In a case where the expected image of the user interface and the actual image of the user interface do not match, each of the electronic devices 102-106 may generate an error message. Furthermore, each of the electronic devices 102-106 may also provide for notification of the error message. One or more applications (e.g., a web browsing application, a client messaging application, etc.) may run on each of the electronic devices 102-106, where the accessing the web site data, the providing for injection of the additional code, the providing for display of the web site, the obtaining the actual image, the receiving the expected image, the comparing, the generating the error message, and the providing for the notification of the error message are performed by the one or more applications running on each of the electronic devices 102-106.

In a case where the expected image of the user interface and the actual image of the user interface do not match, each of the electronic devices 102-106 may provide the server 108 with the actual image of the user interface. Furthermore, each of the electronic devices 102-106 may provide the server with a url of the web site. The full url path of the web site may be truncated, and the truncated url path of the web site may be sent to the server. Each of the electronic devices 102-106 may require user content prior to transferring any data to the server 108.

In a case where the expected image of the user interface and the actual image of the user interface do not match, each of the electronic devices 102-106 may modify the additional code so that the actual image of the user interface matches the expected image of the user interface when injected into the accessed web site data. Each of the electronic devices 102-106 may modify the additional code to reposition the user interface's location with respect to the web site. Each of the electronic devices 102-106 may also modify the additional code to change one or more colors displayed on the user interface. Each of the electronic devices 102-106 may also modify the additional code to change one or more text elements that are included in the user interface.

Server 108 may be any system or device having a processor, a memory, and communications capability for providing web content to electronic devices 102-106. In some example aspects, server 108 can be a single computing device such as a computer server. In other embodiments, server 108 can represent more than one computing device working together to perform the actions of a server computer (e.g., cloud computing).

Server 108 may contain web site data for one or more web sites. Server 108 may transmit web site data for one or more web sites to the respective electronic devices 102-106 via the network 110. Server 108, may also contain expected images of one or more user interfaces. Server 108 may transmit the expected images of the one or more user interfaces to electronic devices 102-106 via the network 110. Server 108 may also obtain actual images of a user interface corresponding to one or more web sites. Server 108 may obtain actual images of a user interface corresponding to selective web sites. Server 108 may contain algorithms and data for selecting web sites. Data for selecting web sites may include volume of access to the web site. Server 108 may transmit the actual images of the user interface to the electronic devices 102-106.

Server 108 may receive data from electronic devices 102-106 via the network. Data may include a web site's url, an actual image of a user interface corresponding to the web site, the expected image of the user interface, an actual image of the entire layout of the web site including the user interface, and an expected image of the entire layout of the web site including the user interface. Server 108 may also receive a url of the web site.

Network 110 can include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Furthermore, in a case where the expected image of the user interface and the actual image of the user interface do not match, each of the electronic devices 102-106 may provide a server with the actual image of the user interface, and provide the server with a url of the web site. Furthermore, in a case where the expected image of the user interface and the actual image of the user interface do not match, each of the electronic devices 102-106 may modify the additional code so that the actual image of the user interface matches the expected image of the user interface when injected into the accessed web site data.

Figure 2:
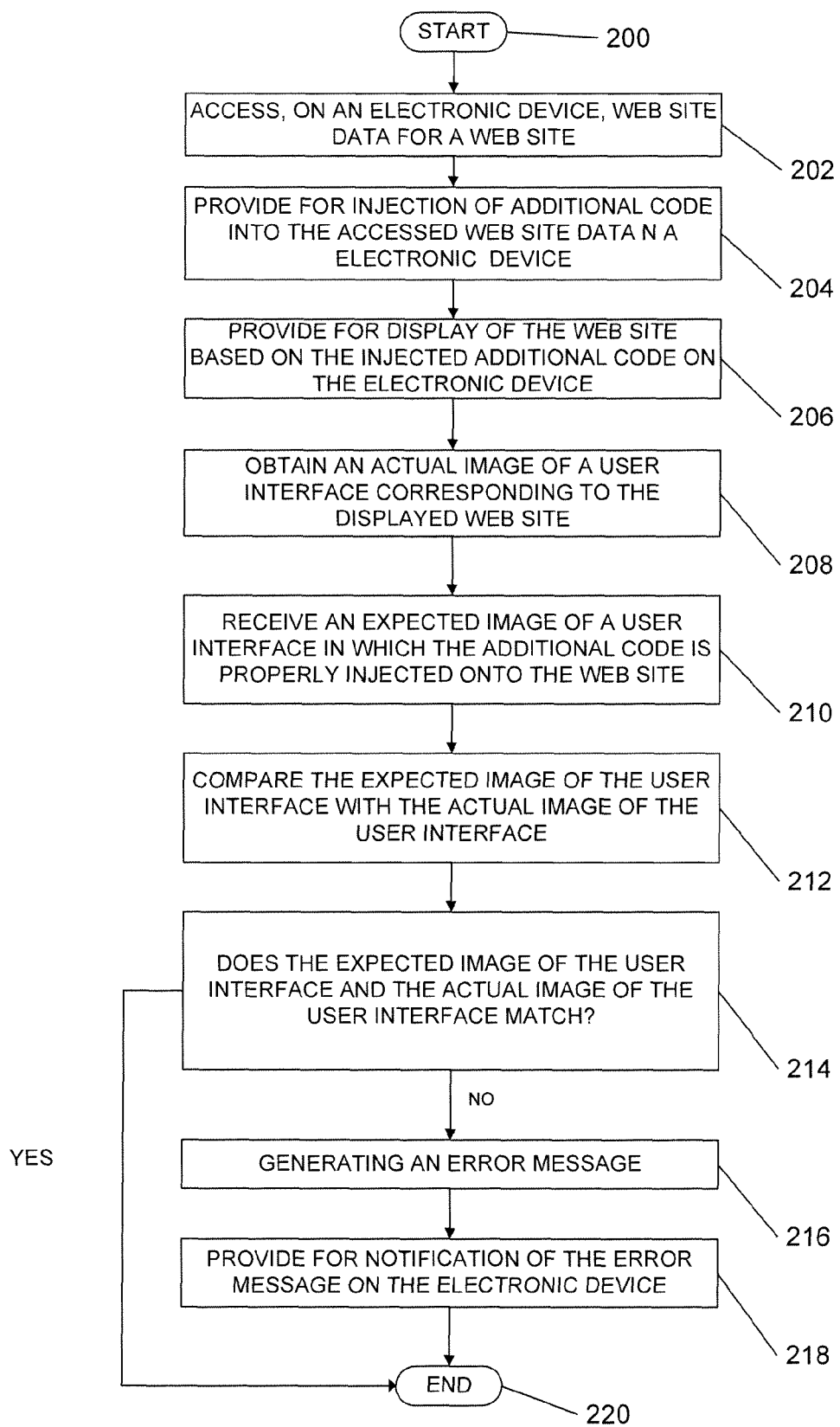
FIG. 2 illustrates an example process for determining whether a user interface is properly injected on an electronic device.

FIG. 2 illustrates an example process for determining whether a user interface is properly injected on an electronic device. One or more applications (e.g., a web browsing application, a client messaging application etc.) may run on the electronic device. Following starting step 200, web site data for a web site are accessed on an electronic device at step 202. A web browsing application running on the electronic device may access web site data for the web site. Additional applications running on the electronic device may also access the web site data. Web site data may include content (e.g., audio content, visual content, textual content, etc.) associated with the web site. Web site data also may include formatting instructions that provide a layout for the web site. The formatting instructions may be written in one or more languages (e.g., HTML, JavaScript, etc.).

At step 204, additional code are provided to be injected into the accessed web site data. The web browsing application running on the electronic device may provide for injection of the additional code. Additional applications running on the electronic device may also provide for injection of the additional code. The additional code may include one or more modifications to the layout of the web site. The additional code may be written in HTML, JavaScript, a style sheet language (e.g., cascading style sheet CSS), etc.) or other suitable programming languages. The additional code may be stored locally on a hardware component of the electronic device (e.g., harddisk, ROM, RAM, etc.). The additional code may also be stored on a server and may be transmitted to the electronic device via the network. The additional code may also be stored on a removable data store (e.g., a CD-ROM, a floppy disk, a removable harddisk, etc.). The additional code may inject a user interface into the layout of the web site. The injected user interface may include audio content (e.g., audio content, visual content, textual content, etc.). The injected user interface may also include one or more user controls (e.g., buttons, toggles, links to other web sites, etc.).

A display of the web site based on the injected additional code is provided at step 206. The web browsing application running on the electronic device may provide an interface to display the web site based on the injected additional code. Additional applications may also provide one or more interfaces for display the web site based on the injected additional code.

At step 208, an actual image of a user interface corresponding to the displayed web site is obtained. The actual image of the user interface may be captured by the server and may be obtained from the server to the electronic device via the network. Alternatively, the actual image of the user interface may be captured locally and stored locally (e.g., on a harddisk, ROM, RAM, etc.). Alternatively, an actual image of the entire layout of the web site including the user interface may be obtained. The web browsing application may obtain the actual image of the user interface corresponding to the displayed web site and the actual image of the entire web site including the user interface. Additional applications may also obtain the respective actual images.

Alternatively, an actual image of the web site may be obtained selectively. A determination, based on prior history, a likelihood the user interface would be properly injected may be made, where, obtaining an actual image of the user interface is based on the likelihood the user interface would be properly injected into the web site. Prior history may include one or more numerical values associated with a number of times one or more user interfaces were improperly injected into the web site, a number of times one or more user interfaces were properly injected into the web site, etc. A numerical value for the likelihood the user interface would be properly injected may be determined based on comparing the one or more numerical values related to the prior history of the web site. Furthermore, a volume of user access to the web site may be determined, where obtaining the actual image of the user interface is based on the volume of user access to the web site.

At step 210, an expected image of a user interface in which the additional code is properly injected into the web site is received. The expected image of the user interface is an image of the user interface as it is properly displayed. The expected image may be generated by a user (e.g., a developer of the user interface). For example, the user may generate an image of what the user expects to see after the user interface is properly injected onto a layout of a web site. The expected image may include the user interface as it is properly displayed. The expected image may also include a portion of, or all of the web site's layout including the properly displayed user interface. The expected image may be generated using one or more applications (e.g., an image rendering application, a web browsing application, etc.). The expected image of the user interface may be stored on the server and transmitted from the server to the electronic device via the network. Alternatively, the expected image of the user interface may be stored locally (e.g., on a harddisk, ROM, RAM, etc.). The expected image of the entire layout of the web site including the user interface may also be received. The web browsing application may receive the expected image of the user interface. Additional applications may also receive the expected image of the user interface.

At step 212, the expected image of the user interface is compared with the actual image of the user interface. Alternatively, the expected image of the entire layout of the web site including the user interface may be compared with the actual image of the entire layout of the web site including the user interface. Comparing the expected image of the user interface with the actual image of the user interface may include comparing each pixel of the expected image with a corresponding pixel of the actual image. Additional methods for comparing the expected image of the user interface with the actual image of the user interface may include comparing one or more textual elements provided by the respective user interfaces, and one or more colors contained in the respective elements.

The electronic device may compare the expected image of the user interface with the actual image of the user interface locally (e.g., through its processor). The comparing the expected image of the user interface with the actual image of the user interface may be performed by the web browsing application or another application running on the electronic device. Alternatively, the electronic device may transmit the expected image of the user interface and/or the actual image of the user interface to the server, for comparison of the expected image of the user interface with the actual image of the user interface. One or more factors may determine whether the comparison process is performed by the electronic device or by the server.

User consent may be required to transmit the expected image of the user interface and/or the actual image of the user interface to the server. Where user consent has been granted, whether the comparison is performed by the electronic device or performed by the server may be dependent on additional factors including amount of time the comparison may be made on the electronic device vs., amount of time the comparison may be made on the server, connectivity of the electronic device to the server, and amount of time required to transmit the expected image of the user interface and/or the actual image of the user interface from the electronic device to the server, and from the server to the electronic device.

In a case where the actual image of the web site may be obtained selectively, comparing the expected image of the user interface with the actual image of the user interface may be based on the likelihood the user interface would be properly injected into the web site. Furthermore, comparing the expected image of the user interface with the actual image of the user interface may also be based on the volume of user access to the web site. For example, an actual image of a web site that has an average volume of user access to the web site is below a predetermined threshold may be taken.

At step 214, in a case the expected image of the user interface and the actual image of the user interface do not match, an error message is generated in step 216. Otherwise, the process proceeds to end block 220 as shown in FIG. 2. An error message may also be generated where the expected image of the entire layout of the web site including the user interface and the actual image of the entire layout of the web site including the user interface do not match. At step 218, a notification of the error message is provided on the electronic device. A notification of the error message may also be provided on the electronic device where the expected image of the entire layout of the web site including the user interface and the actual image of the entire layout of the web site including the user interface do not match. The generating of the error message and the providing for notification of the error message may be performed by the web browsing application or by another application running on the electronic device.

In a case the expected image of the user interface and the actual image of the user interface do not match, the server may also be provided with the actual image of the user interface. Furthermore, the server may also be provided with a url of the web site. The url of the web site may be truncated before it is sent to the server to prevent the server from identifying the entire path of the web site. Furthermore, user consent may be necessary in order to transfer any data to from the electronic device to the server.

In a case the expected image of the user interface and the actual image of the user interface do not match, the additional code, which provides instructions to inject the user interface, may be modified so that the actual image of the user interface matches the expected image of the user interface when injected into the accessed web site data.

Where the position of the user interface displayed in the expected image do not match the position of the user interface displayed in the actual image, the additional code may be modified to reposition the location of the user interface with respect to the web site so that the actual image of the user interface matches the expected image of the user interface. Where one or more colors used in the expected image of the user interface are different than the one or more colors used in the actual image of the user interface, the additional code may be modified so that the one or more colors used in the actual image of the user interface matches the one or more colors used in the expected image of the user interface. Where one or more text elements included in the expected image of the user interface do not match the one or more text elements included in the actual image of the user interface, the additional code may be modified so that the one or more text elements included in the actual image of the user interface matches the one or more textual elements included in the expected image of the user interface. Additional modifications to the additional code may be made to match the actual image of the user interface with expected image of the user interface when injected into the accessed web site data. The process then ends at end block 220.

FIG. 3A illustrates an example of an expected image of the user interface. FIG. 3A depicts a web browsing application 302 running on a desktop electronic device 300 that provides an interface for displaying an expected image of a user interface 304 (a). A different software application (e.g., a client messaging application, or another application that can access a web site and provide an interface to display content related to the web site) running on a different type of electronic device (e.g., a laptop computer, a tablet computer, etc.) may also provide an interface (e.g., a window, a panel, a pop up, etc.) to display the expected image of the user interface 304 (a).

The user interface as shown in FIG. 3A includes a first user selectable control 306 (a) that allows the user to "add" the web site to the user's list of favorite web sites and a second user selectable control 306 (b) that allows the user to "edit" the web site's layout. FIG. 3A also includes a input box 308 that allows the user to enter user designated text. The user selectable controls 306 (a), 306 (b) and input box 308 may be displayed at another location with respect to the user interface. Additional user interfaces may contain other user selectable controls (e.g., input boxes, toggles, etc.) displayed in a different location with respect to the additional user interfaces to initiate other user actions. Additional user interfaces may also provide additional content (e.g., text, image audio, video, etc.).

FIG. 3B illustrates an example of an actual image of the user interface of FIG. 3A. The actual image of the user interface 304 (b) as shown in FIG. 3B does not match the expected image of the user interface 304 (a) as shown in FIG. 3A. In particular, the position of the second user selectable control 306 (b) with respect to the actual image of the user interface 304 (a) does not mach with the position of the second user selectable control 306 (b) with respect to the expected image of the user interface 304 (a). In a case where a expected image of a user interface and an actual image of the user interface do not match, an error message may be generated. In FIG. 3B an error message 310 is displayed to notify the user. The error message 310 may include additional content and/or one or more visual representations. A single interface (e.g., a tab interface, a window, a popup, etc.) may provide both the image of the actual interface 304 (a) and the error message 310. Alternatively, the error message 310 may be provided in a separate interface.

Figure 3C:
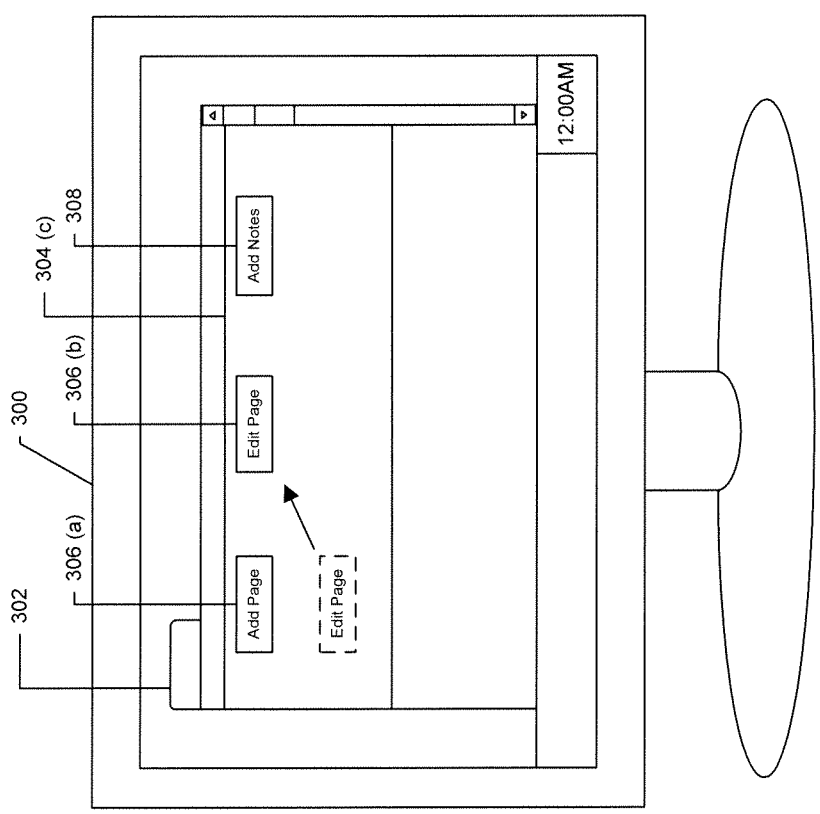
FIG. 3C illustrates an example of a modified image of the user interface of FIG. 3A after code associated with the user interface has been modified to match the actual image of the user interface with the expected image of the user interface.

FIG. 3C illustrates an example of a modified image of the user interface 304 (c) of FIG. 3A after code associated with the user interface has been modified to match the actual image of the user interface with the expected image of the user interface. Prior to the modification, the position of the second user selectable control 306 (b) with respect to the actual image of the user interface 304 (c) does not mach with the position of the second user selectable control 306 (b) with respect to the expected image of the user interface 304 (a). A pixel by pixel comparison of the expected image of the user interface 304 (a) and the actual image of the user interface 304 (c) may be made. Where the position of the user interface displayed in the expected image does not match the position of the user interface displayed in the actual image, the code associated with the user interface may be modified to reposition the location of the user interface with respect to the web site so that the actual image of the user interface matches the expected image of the user interface. In the example illustrated by FIG. 3C, code associated with the user interface has been modified to reposition the second user control to match the location of the second user control as shown in the expected image of the user interface. Additional modifications may include repositioning the entire user interface, changing one or more colors displayed in the actual image of the user interface, modifying one or more text elements included in the actual image of the user interface to match the expected image of the user interface.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
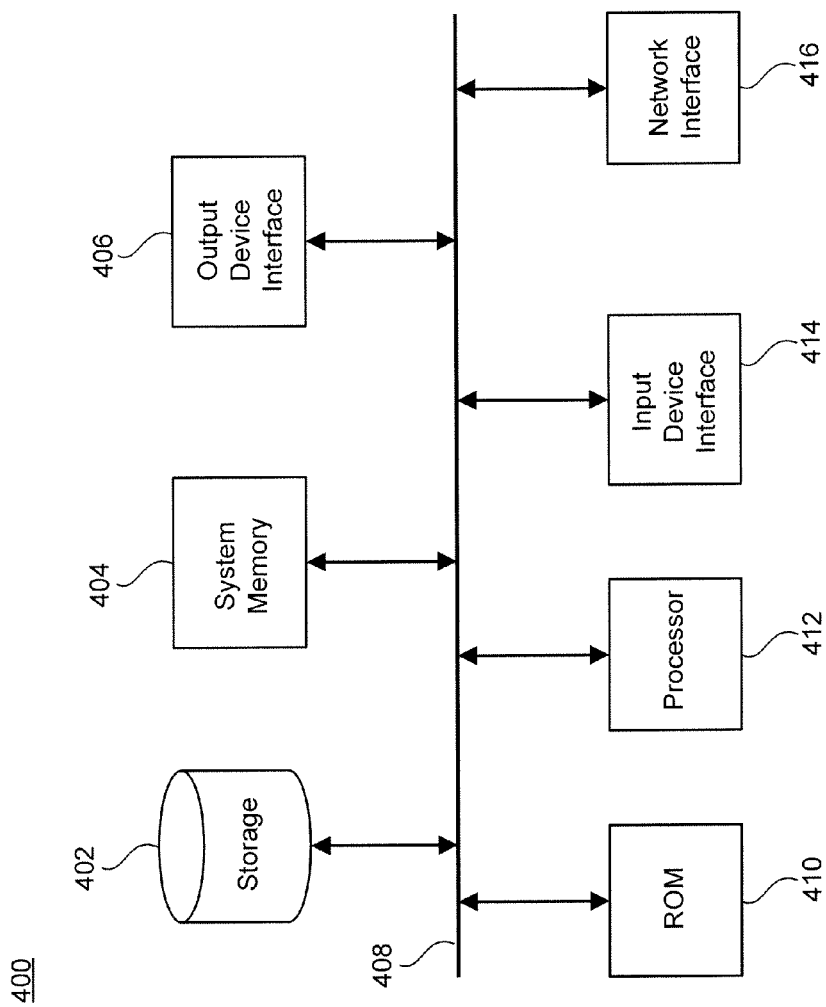
FIG. 4 conceptually illustrates an electronic system with which some implementations of the subject technology are implemented.

FIG. 4 conceptually illustrates an electronic system with which some implementations of the subject technology are implemented. Electronic system 400 can be a laptop computer a desktop computer, smartphone, PDA, a tablet computer or any other sort of device 102-106. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's electronic device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to an electronic device (e.g., for purposes of displaying data to and receiving user input from a user interacting with the electronic device). Data generated at the electronic device (e.g., a result of the user interaction) can be received from the electronic device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for determining whether a user interface is properly injected on an electronic device, the method comprising:
    accessing, on an electronic device, web site data for a web site;
    providing for injection of additional code into the accessed web site data;
    providing for display of the web site based on the injected additional code;
    obtaining an actual image of a user interface corresponding to the displayed web site;
    receiving an expected image of a user interface in which the additional code is properly injected into the web site;
    determining the amount of time needed for comparing, by a server, the expected image of the user interface with the actual image of the user interface, wherein user consent has been granted;
    determining the amount of time needed for comparing, by the electronic device, the expected image of the user interface with the actual image of the user interface, wherein user consent has been granted;
    comparing the expected image of the user interface with the actual image of the user interface by one of the server and the electronic device based on the determined amounts of time, wherein user consent has been granted; and
    in a case where the expected image of the user interface and the actual image of the user interface do not match,
        generating an error message; and
        providing for notification of the error message on the electronic device.

2. The computer-implemented method of claim 1, the method further comprising:
in a case where the expected image of the user interface and the actual image of the user interface do not match,
providing the server with the actual image of the user interface; and
providing the server with a url of the web site.

3. The computer-implemented method of claim 1, the method further comprising:
in a case where the expected image of the user interface and the actual image of the user interface do not match,
providing for modifying the additional code so that the actual image of the user interface matches the expected image of the user interface when injected into the accessed web site data.

4. The computer-implemented method of claim 3, wherein providing for modifying the additional code comprises providing for modifying the additional code to reposition a location of user interface with respect to the web site so that the actual image of the user interface matches the expected image of the user interface.

5. The computer-implemented method of claim 3, wherein providing for modifying the additional code comprises providing for modifying the additional code to modify one or more colors included in the user interface so that the one or more colors used in the actual image of the user interface matches the one or more colors used in the expected image of the user interface.

6. The computer-implemented method of claim 3, wherein providing for modifying the additional code comprises providing for modifying the additional code to modify one or more text elements included in the user interface so that the one or more text elements included in the actual image of the user interface matches the one or more text elements included in the expected image of the user interface.

7. The computer-implemented method of claim 2, further comprising:
truncating a url of the web site, wherein providing the server with a url of the web site comprises providing the server with the truncated url of the web site.

8. The computer-implemented method of claim 1, further comprising:
obtaining an actual image of an entire layout of the web site including the user interface;
receiving an expected image of the entire layout of the web site including the user interface;
comparing the expected image of the entire layout of the web site with the actual image of the entire layout of the web site; and
in a case where the expected image of the entire layout of the web site and the actual image of the entire layout of the web site do not match,
generating the error message; and
providing for notification of the error message on the electronic device.

9. The computer-implemented method of claim 1, wherein comparing the expected image of the user interface with the actual image of the user interface comprises comparing each pixel of the expected image with a corresponding pixel of the actual image.

10. The computer-implemented method of claim 1, wherein comparing the expected image of the user interface with the actual image of the user interface is performed by the electronic device.

11. The computer-implemented method of claim 1, further comprising transmitting the expected image of the user interface and the actual image of the user interface to the server, for comparison of the expected image of the user interface with the actual image of the user interface.

12. The computer-implemented method of claim 1, further comprising: determining based on prior history, a likelihood that the user interface would be properly injected into the web site, and wherein comparing the expected image of the user interface with the actual image of the user interface is based on the likelihood that the user interface would be properly injected into the web site.

13. The computer-implemented method of claim 1, further comprising: determining a volume of access to the web site, wherein comparing the expected image of the user interface with the actual image of the user interface is based on the volume of access to the web site.

14. The computer-implemented method of claim 1, wherein the accessing the web site data, the providing for injection of the additional code, the providing for display of the web site, the obtaining the actual image, the receiving the expected image, the comparing, the generating the error message, and the providing for the notification of the error message are performed by a web browsing application running on the electronic device.

15. The computer-implemented method of claim 1, wherein the additional code comprises HTML, JavaScript or Cascading Style Sheet.

16. A system for determining whether a user interface is properly injected on an electronic device, the system comprising:
one or more processors, and
a machine-readable medium comprising instructions stored therein, which when executed by the processors, cause the processors to perform operations comprising:
accessing, on an electronic device, web site data for a web site;
providing for injection of additional code into the accessed web site data;
providing for display of the web site based on the injected additional code;
obtaining an actual image of a user interface corresponding to the displayed web site;
receiving an expected image of a user interface in which the additional code is properly injected into the web site;
determining the amount of time needed for comparing, by a server, the expected image of the user interface with the actual image of the user interface, wherein user consent has been granted;
determining the amount of time needed for comparing, by the electronic device, the expected image of the user interface with the actual image of the user interface, wherein user consent has been granted;
comparing the expected image of the user interface with the actual image of the user interface by one of the server and the electronic device based on the determined amounts of time, wherein user consent has been granted; and
in a case where the expected image of the user interface and the actual image of the user interface do not match,
generating an error message;
providing for notification of the error message on the electronic device.

17. The system of claim 16, the method further comprising:
in a case where the expected image of the user interface and the actual image of the user interface do not match,
providing for modifying the additional code so that the actual image of the user interface matches the expected image of the user interface when injected into the accessed web site data.

18. The system of claim 17, wherein providing for modifying the additional code comprises providing for modifying the additional code to reposition a location of user interface with respect to the web site so that the actual image of the user interface matches the expected image of the user interface.

19. The system of claim 17, wherein providing for modifying the additional code comprises providing for modifying the additional code to modify one or more colors included in the user interface so that the one or more colors used in the actual image of the user interface matches the one or more colors used in the expected image of the user interface.

20. The system of claim 17, wherein providing for modifying the additional code comprises providing for modifying the additional code to modify one or more text elements included in the user interface so that the one or more text elements included in the actual image of the user interface matches the one or more text elements included in the expected image of the user interface.

21. The system of claim 16, wherein the additional code comprises HTML, JavaScript or Cascading Style Sheet.

22. The system of claim 16, further comprising:
truncating a url of the web site, wherein providing the server with a url of the web site comprises providing the server with the truncated url of the web site.

23. The system of claim 16, wherein comparing the expected image of the user interface with the actual image of the user interface comprises comparing each pixel of the expected image with a corresponding pixel of the actual image.

24. The system of claim 16, wherein the accessing the web site data, the providing for injection of the additional code, the providing for display of the web site, the obtaining the actual image, the receiving the expected image, the comparing, the generating the error message, and the providing for the notification of the error message are performed by a web browsing application running on the electronic device.

25. A non-transitory machine-readable medium comprising instructions stored therein, which when executed by a system, cause the system to perform operations comprising:
accessing, on an electronic device, web site data for a web site;
providing for injection of additional code into the accessed web site data, wherein the additional code comprises HTML, JavaScript or Cascading Style Sheet;
providing for display of the web site based on the injected additional code;
obtaining an actual image of a user interface corresponding to the displayed web site;
receiving an expected image of a user interface in which the additional code is properly injected into the web site;
determining an amount of time needed to transmit at least one of the expected and actual images of the user interface from the electronic device to a server, wherein user consent has been granted;
determining an amount of time needed to transmit the at least one of the expected and actual images of the user interface from the server to the electronic device, wherein user consent has been granted;
comparing the expected image of the user interface with the actual image of the user interface by one of the server and the electronic device based on the determined amounts of time, wherein user consent has been granted; and
in a case where the expected image of the user interface and the actual image of the user interface do not match,
generating an error message;
providing for notification of the error message on the electronic device;
providing a server with the actual image of the user interface;
providing the server with a url of the web site; and
modifying the additional code so that the actual image of the user interface matches the expected image of the user interface when injected into the accessed web site data.

26. The machine-readable medium of claim 25, further comprising:
truncating a url of the web site, wherein providing the server with a url of the web site comprises providing the server with the truncated url of the web site.

27. The machine-readable medium of claim 25, wherein comparing the expected image of the user interface with the actual image of the user interface comprises comparing each pixel of the expected image with a corresponding pixel of the actual image.

28. The machine-readable medium of claim 25, wherein the accessing the web site data, the providing for injection of the additional code, the providing for display of the web site, the obtaining the actual image, the receiving the expected image, the comparing, the generating the error message, and the providing for the notification of the error message are performed by a web browsing application running on the electronic device.

* * * * *